United States Patent [19]

Tominaga

[11] Patent Number: 5,057,729
[45] Date of Patent: Oct. 15, 1991

[54] RESIN-SEALED ROTARY ACTUATOR FOR VARIABLE SHOCK ABSORBER

[75] Inventor: Tsutomu Tominaga, Himeji, Japan
[73] Assignee: Mitsubishi Denki Kabushiki Kaisha, Tokyo, Japan
[21] Appl. No.: 572,655
[22] Filed: Aug. 27, 1990
[30] Foreign Application Priority Data Aug. 29, 1989 [JP] Japan .............................. 1-100629[U]

[51] Int. Cl.⁵ .............................. H02K 5/10; F16F 9/36
[52] U.S. Cl. ...................................... 310/89; 188/299
[58] Field of Search .............. 188/267, 290, 299, 306, 188/319; 280/714; 293/134; 310/42, 67 R, 68 R, 71, 88, 89, 268

[56] References Cited

U.S. PATENT DOCUMENTS

| | | | |
|---|---|---|---|
| 3,922,574 | 11/1975 | Whiteley | 310/156 |
| 4,776,437 | 10/1988 | Ishibashi et al. | 188/299 |
| 4,814,651 | 3/1989 | Elris et al. | 310/88 |
| 4,973,854 | 11/1990 | Hummel | 188/299 |
| 4,982,125 | 1/1991 | Shirakawa | 310/88 |

FOREIGN PATENT DOCUMENTS 131577  8/1988  Japan .

Primary Examiner—Steven L. Stephan
Assistant Examiner—D. L. Rebsch
Attorney, Agent, or Firm—Sughrue, Mion, Zinn, Macpeak and Seas

[57] ABSTRACT

An electromagnetic actuator varies the cross-sectional area of a passage of damping oil in a variable damping force shock absorber. The wires leading from coils of the actuator are led through a groove formed between the edge of an opening formed in a housing and an outer peripheral portion of the cover, the groove being charged with a binding resin, whereby the watertightness of the actuator is maintained for a longer time and the assembly of the actuator is facilitated.

2 Claims, 3 Drawing Sheets

RESIN-SEALED ROTARY ACTUATOR FOR VARIABLE SHOCK ABSORBER

BACKGROUND OF THE INVENTION

1. Field of the Invention

The present invention relates to an actuator and, more particularly, to an actuator for use in changing the cross-sectional area of an oil passage in a shock absorber of a variable damping force suspension system.

2. Description of the Related Art

FIG. 1 is a sectional side elevational view of a conventional actuator of the kind described, while FIG. 2 is a sectional view taken along the line II—II of FIG. 1. The actuator has a housing 1 provided at its one side with an opening, and an annular permanent magnet 2 rotatably mounted in the housing 1. An output shaft 4 is received in the center of a yoke 3 which is fixed to the inner periphery of the permanent magnet 2. A pin 5 fixed to the output shaft 4 engages with a groove 3a formed in the yoke 3. A stator 6, which surrounds the permanent magnet 2, is provided on its inner peripheral surface with projecting poles 6a to 6f opposing the permanent magnet 2. Coils 7a to 7f are wound on the projecting poles 6a to 6f, respectively. Terminals 8a to 8d are connected to the coils 6a to 6f and also to lead wires 9a to 9c. The opening in the housing 1 is covered by a cover 10. A rubber cap 11 covers the housing 1 together with the cover 10. One end of a shock absorber 12 abuts the actuator through a rubber ring 13.

In this actuator, the stator 6 is press-fitted in the housing 1, while the permanent magnet 2 and the yoke 3 are rotatably mounted. The rotation of the permanent magnet 2 and the yoke 3 is transmitted to the output shaft 4 through the pin 5 which engages with the groove 3a formed in the yoke 3. The permanent magnet 2 and, hence, the yoke 3, as well as the output 4, are prevented from moving axially by the cover 10. The lead wires 9a to 9c connected to the terminals 8a to 8c are led to the exterior through holes 11a to 11c which are formed in the rubber cap 11. The juncture between the housing 1 and the cover 10 is covered by the rubber cap 11 which prevents water droplets from coming into the juncture. Invasion of water droplets from the lower side is also prevented by the fact that the shock absorber 12 abuts the rubber ring 13.

In order to prevent invasion of the interior of the actuator by water droplets, the diameter of the holes 11a to 11c formed in the rubber cap 11 is smaller than the diameter of the lead wires 9a to 9c. Consequently, a troublesome work is required for the reading the lead wires 9a to 9c through the holes 11a to 11c. In addition, the watertightness of the housing 1 tends to be degraded due to reduction in the elasticity of the rubber cap as a result of a molecular change.

SUMMARY OF THE INVENTION

Accordingly, an object of the present invention is to provide an actuator which can easily be assembled and which can maintain high watertightness for a long time, thereby overcoming the above-described problems of the prior art.

To this end, according to the present invention, there is provided an actuator comprising: a housing provided at its one side with an opening; an annular permanent magnet rotatably mounted in the housing; an output shaft connected to the permanent magnet; a stator fixed in the housing with a radial gap from the permanent magnet and provided with projected poles; coils would on the stator; and a cover closing the opening of the housing and cooperating with the cover in clamping therebetween the stator, the outer peripheral portion of the cover being recessed in a tapered form so that a groove is formed between the outer peripheral portion of the cover and the edge of the opening of the housing, the lead wires leading from the coils being led externally through the groove, the groove being charged with a bonding resin.

According to the invention, the lead wires are externally led through a groove formed between the outer periphery of the cover and the open edge of the housing, and the groove is filled with a bonding resin. It is thus possible to improve the watertightness at the juncture between the housing and the cover and to seal the portion through which the lead wires are led.

DESCRIPTION OF THE PREFERRED EMBODIMENT

Figure 1:
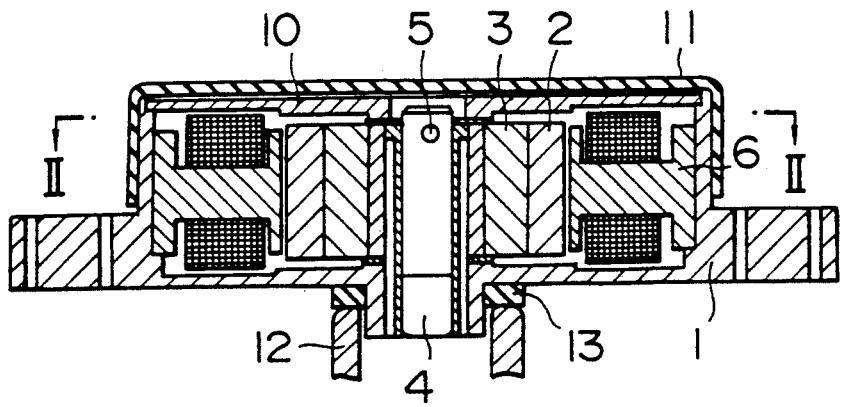
FIG. 1 is a sectional side elevational view of a conventional actuator.
Figure 2:
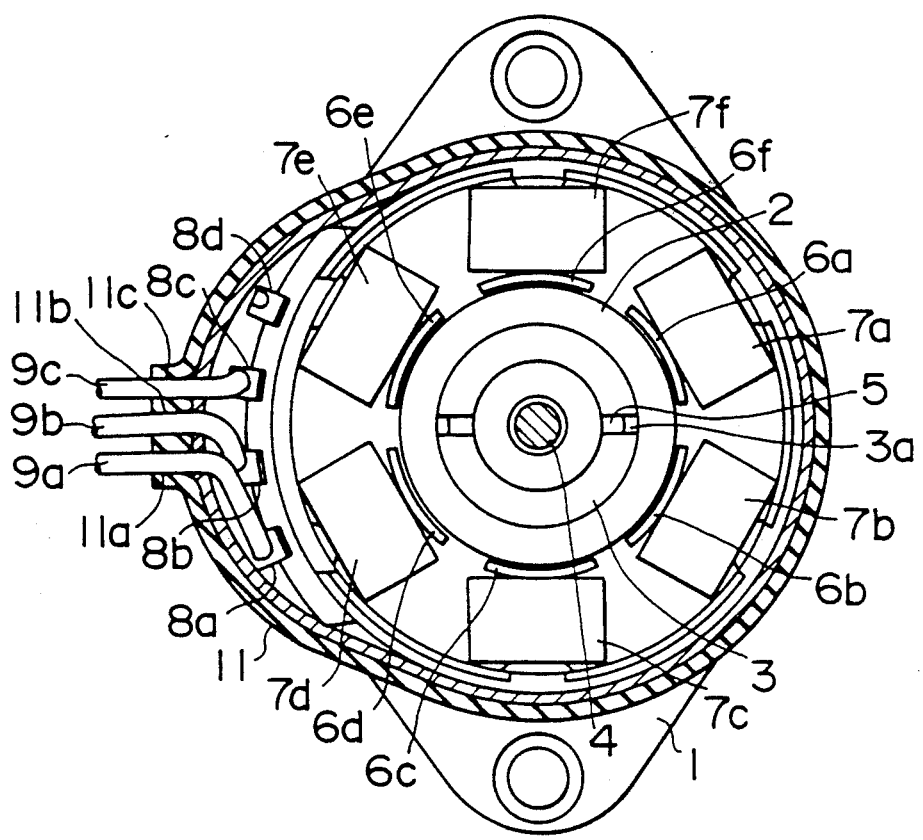
FIG. 2 is a sectional view taken along the line II—II of FIG. 1.
Figure 3:
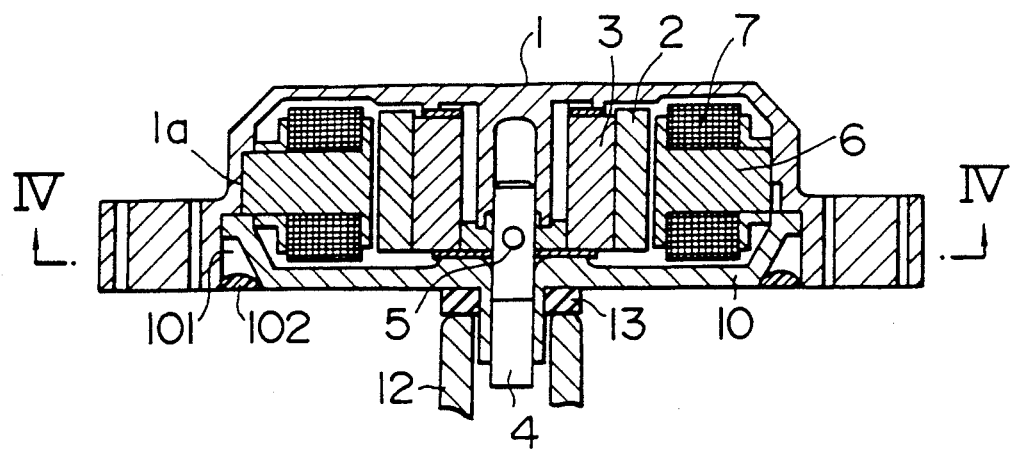
FIG. 3 is a sectional side elevational view of an embodiment of the actuator in accordance with the present invention.
Figure 4:
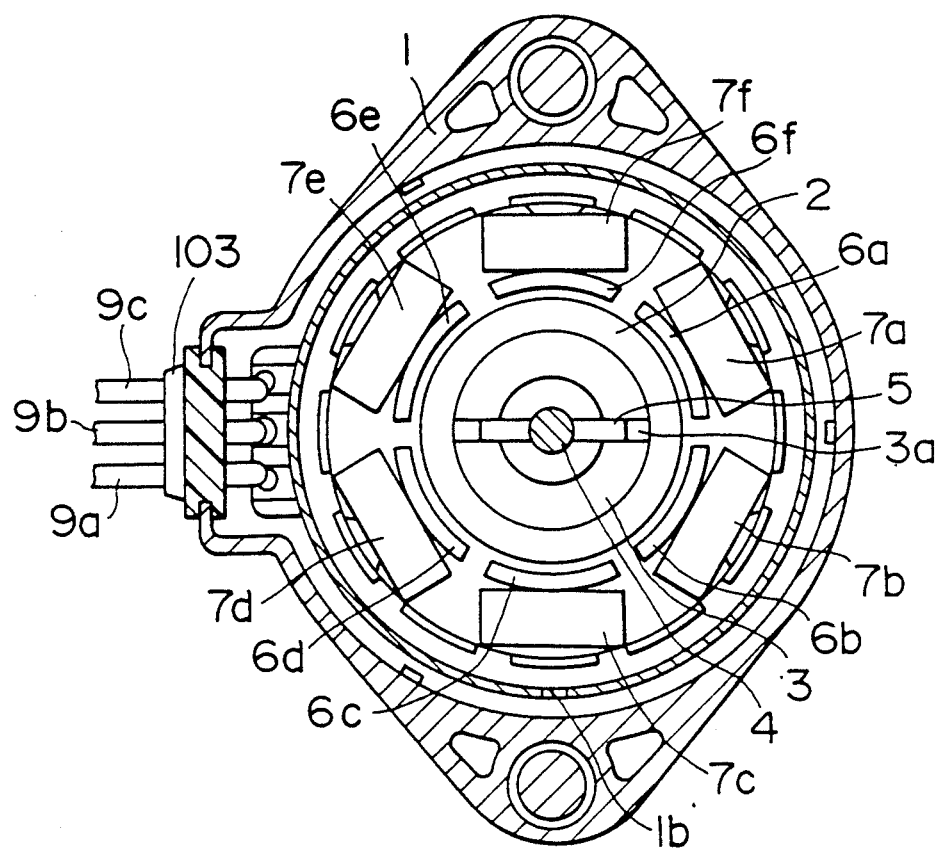
FIG. 4 is a sectional view taken along the line IV—IV of FIG. 3.
Figure 5:
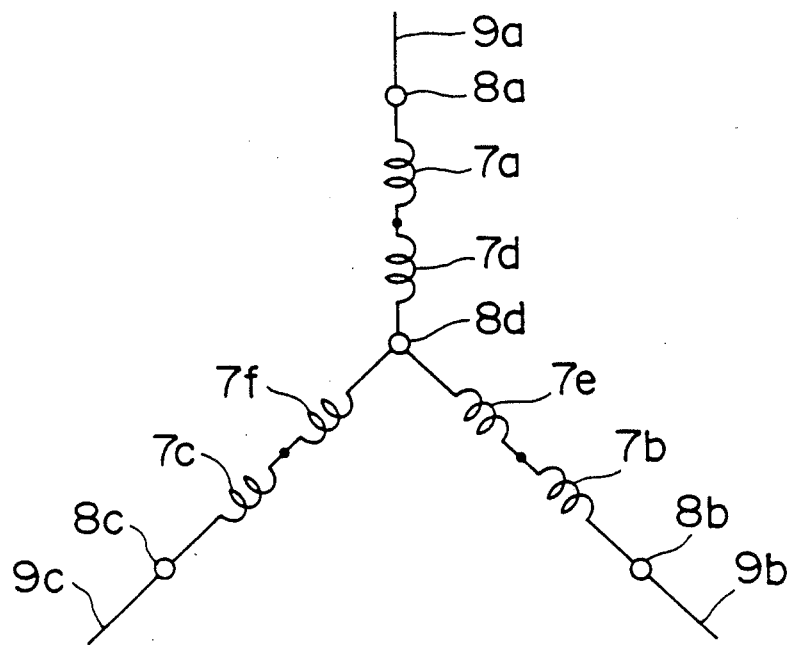
FIG. 5 is a connection diagram showing the connection of coils.

FIG. 3 is a sectional side elevational view of an actuator embodying the present invention, while FIG. 4 is a sectional view taken along the line IV—IV of FIG. 3. The actuator has a housing 1 provided at its lower side with an opening, and an annular permanent magnet 2 magnetized to develop four poles and rotatably mounted in the housing 1. An output shaft 4 is received in the center of a yoke 3 which is fixed to the inner periphery of the permanent magnet 2 and which is provided at its lower portion with an engaging portion 3a. A pin 5 fixed to the output shaft 4 engages with the engaging portion 3a of the yoke 3 so that the torque of the permanent magnet 2 is transmitted to the output shaft 4. A stator 6, which surrounds the permanent magnet 2, is provided on its inner peripheral surface with projecting poles 6a to 6f opposing the permanent magnet 2. The stator 6 engages step 1a on the housing 1 and is prevented from rotating by a stopper 1b. Coils 7a to 7f are wound on the projecting poles 6a to 6f, respectively. The coils 7a to 7c are connected at their one ends to lead wires 9a to 9c through terminals 8a to 8c (not shown), while the coils 7d to 7f are connected at their other ends to a terminal 8d. Thus, the coils 7a and 7d, 7b and 7e and 7c and 7f are respectively connected in series. The opening in the housing 1 is covered by a cover 10. The outer peripheral portion of the cover 10 is recessed in a tapered form so that a groove 101 is formed between the cover 10 and the edge of the opening of the housing 1. Lead wires 9a to 9c are led to the exterior through this groove 101. The groove 101 is filled with an epoxy resin which is a bonding resin. A grommet 103 is provided in order to prevent any accidental cutting of the lead wires 9a to 9c. The shock absorber 12 abuts at one end with the actuator through a rubber ring 13.

In the actuator of the invention having the described construction, the epoxy resin 102 fills the groove 101 in the juncture between the housing 1 and the cover 10 so as to seal the juncture and the portion through which the lead wires 9a to 9c are led. In addition, the shock absorber 12 abuts the rubber ring 13 at one end. It is therefore possible to prevent water droplets from coming into the actuator from the lower side thereof.

The operation of the actuator is as follows. The lead wire 9a and the lead wire 9b are respectively connected to the plus side and the minus side of a power supply through a change-over means (not shown). Consequently, an electric current flows from the lead wire 9a to the lead wire 9b via the terminal 8a, coil 7a, coil 7d, terminal 8d, coil 7e, coil 7b and the terminal 8b, so that the poles 6a to 6d are excited to N, while the poles 6b and 6e are excited to S. In this state, the S pole of the permanent magnet 2 is attracted by the N poles 6a and 6d so that the permanent magnet 2 is stopped at a position where the balance is attained between the attracting fore and the load torque. A similar operation is performed to change-over the output position when the change-over means is switched to cause the electrical currents to flow from the lead wire 9b to the lead wire 9c and from the lead wire 9c to the lead wire 9a.

As has been described, according to the present invention, the lead wires are led through a groove formed between the edge of the opening in the housing 1 and the outer peripheral portion of the cover, and this groove is charged with a bonding resin. Consequently, good watertightness is maintained for a long time and the assembly of the actuator is appreciably facilitated.

What is claimed is:

1. An actuator comprising:
   a housing provided at one side thereof with an opening;
   an annular permanent magnet rotatably mounted in said housing;
   an output shaft connected to said permanent magnet;
   a stator fixed in said housing with a radial gap from said permanent magnet and provided with projected poles;
   coils wound on said stator; and
   a cover closing said opening of said housing and cooperating with said housing in clamping therebetween said stator, the outer peripheral portion of said cover being recessed in a tapered form so that a groove is formed between the outer peripheral portion of said cover and the edge of the opening of said housing, the lead wires leading from said coils being led externally through said groove, said groove being charged with a bonding resin.

2. An actuator according to claim 1 wherein said bonding resin is an epoxy resin.

* * * * *